United States Patent [19]

Fadel

[11] Patent Number: 5,128,531
[45] Date of Patent: Jul. 7, 1992

[54] OPTICAL PROFILE READER, PARTICULARLY FOR KEY DUPLICATING MACHINE

[76] Inventor: Paolo Fadel, Via Manzoni I-31048, S. Biago di Callalta, Italy

[21] Appl. No.: 499,260
[22] PCT Filed: Oct. 2, 1989
[86] PCT No.: PCT/EP89/01157
§ 371 Date: Jun. 1, 1990
§ 102(e) Date: Jun. 1, 1990
[87] PCT Pub. No.: WO90/03867
PCT Pub. Date: Apr. 19, 1990

[30] Foreign Application Priority Data

Oct. 3, 1988 [IT] Italy ............... 84136 A/88

[51] Int. Cl.⁵ .............. G05B 1/00; B23C 1/16
[52] U.S. Cl. ............... 250/202; 409/81; 409/83; 250/201.1
[58] Field of Search ........... 409/81–83, 409/96, 128; 356/377, 376; 250/202, 560, 201.1

[56] References Cited

U.S. PATENT DOCUMENTS

| | | | |
|---|---|---|---|
| 2,430,924 | 11/1947 | Fowle et al. | 409/96 |
| 2,622,485 | 12/1952 | Martellotti | 409/96 |
| 3,259,022 | 7/1966 | Vietorisz | 409/96 |
| 3,429,207 | 2/1969 | John | 82/11.1 |
| 3,945,298 | 3/1976 | Cockroft | 409/83 |
| 4,300,170 | 11/1981 | Sakamoto | 250/202 |
| 4,652,765 | 3/1987 | Nishihara | 250/202 |
| 4,657,448 | 4/1987 | Alexander | 409/81 |

FOREIGN PATENT DOCUMENTS 2006426 8/1978 United Kingdom .

Primary Examiner—David C. Nelms
Assistant Examiner—Michael Messinger
Attorney, Agent, or Firm—Hoffman, Wasson & Gitler

[57] ABSTRACT

A optical profile reader, particularly for key duplicating machines, incorporationg a photoemitter (16) positioned on one side of the profile (11) to be read, and a photodetector (21) facing the photoemitter (16), but on the opposite side of the profile to be read. Stepper motors (5, 8) are included for causing the profile (11) to be read to move orthogonal to the direction of a light beam striking the profile to be read. An electronic circuit controlled by the output signal of the photodetector (21) is also provided. The electronic circuit uses a threshold discriminator (25) set at a value between the values corresponding to the maximum and minimum illumination states of the photodector (21). The threshold discrimination circuit (25) also controls the operation of the stepper motors (5, 8).

7 Claims, 2 Drawing Sheets

OPTICAL PROFILE READER, PARTICULARLY FOR KEY DUPLICATING MACHINE

FIELD OF THE INVENTION

This invention relates to an optical profile reader, particularly for a key duplicating machine.

BACKGROUND OF THE INVENTION

Known optical readers are used for example in robotics for controlling the shape and dimensions of workpieces. These are devices of undoubted reliability but they are also very complicated and can find practical use only in highly sophisticated equipment, their cost being so high that they could not be conveniently used in other sectors such as in key duplicating machines. In this latter sector the profile of a key is in fact generally read mechanically by sliding along the profile of the original key to be duplicated a feeler mechanically connected to a cutter which duplicates this profile on a blank key to be cut.

One drawback of this known reading system is that the movement of the feeler in contact with the key profile results in mutual wear.

The wear undergone by the feeler results in a loss of reproductive accuracy, while the wear undergone by the original key can mean that with the passing of time it is no longer possible to use it to cut further keys able to operate the respective lock, and that finally the key itself is of no further use.

A further drawback of a mechanical key reader is that the data which is read must be used directly and immediately, and cannot be memorized. It is therefore not possible to delay the use of the data, and in particular where a certain number of copies are to be obtained from a given original it is necessary to repeat the reading this number of times, with all the aforesaid drawbacks which arise which each reading.

SUMMARY OF THE INVENTION

An object of the invention is to provide an optical reader for profiles in general, and particularly for key duplicating machines, which is of reliable operation, is of low cost and can be constructed using components easily available commercially.

A further object of the invention is to provide an optical reader which allows the read information to be preserved for subsequent and repeated use.

These and further objects which will be apparent from the description given hereinafter are attained according to the invention by an optical profile reader, particularly for key duplicating machines.

BRIEF DESCRIPTION OF THE DRAWINGS

A preferred embodiment of the present invention is described hereinafter with reference to the accompanying drawings in which.

DETAILED DESCRIPTION OF THE PREFERRED EMBODIMENT

Figure 1:
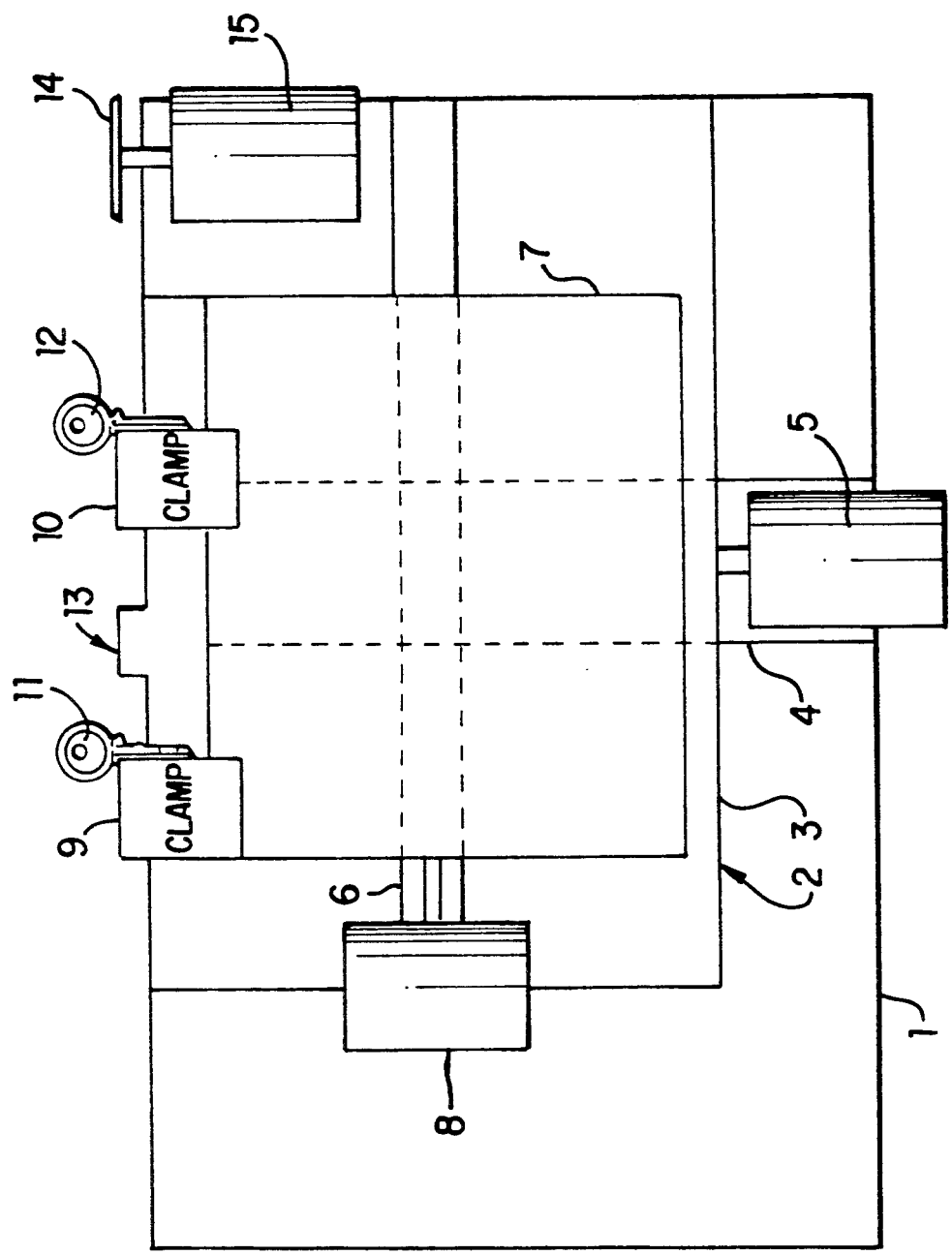
FIG. 1 a plan schematic view of a key duplicating machine provided with the optical reader according to the invention.
Figure 2:
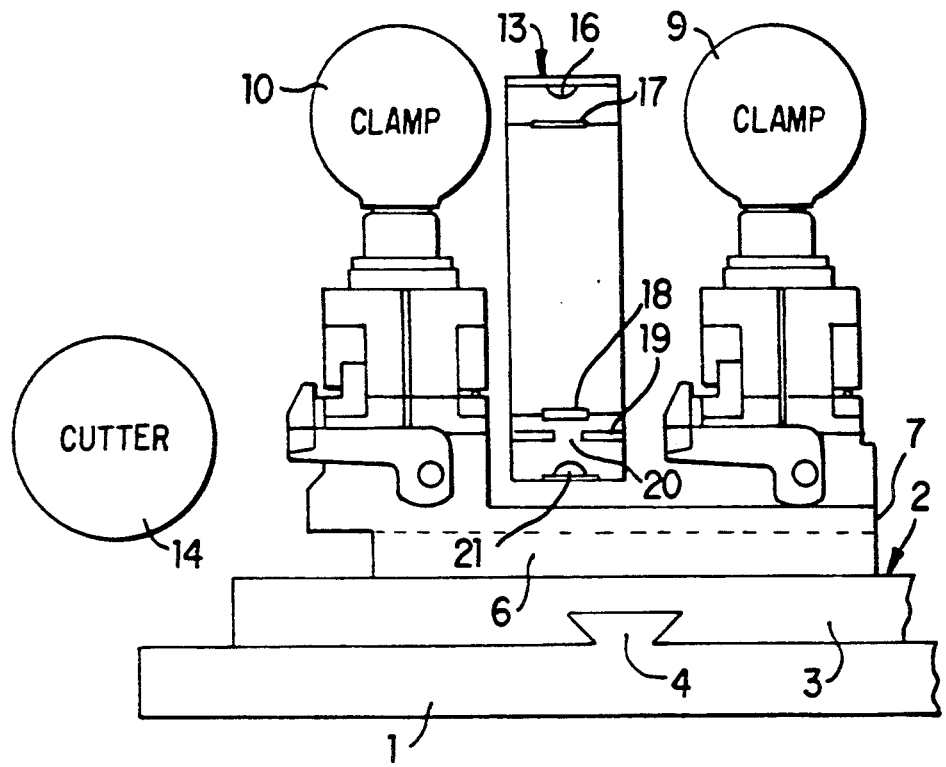
FIG. 2 shows in side detailed view the duplicating machine according to the invention.
Figure 3:
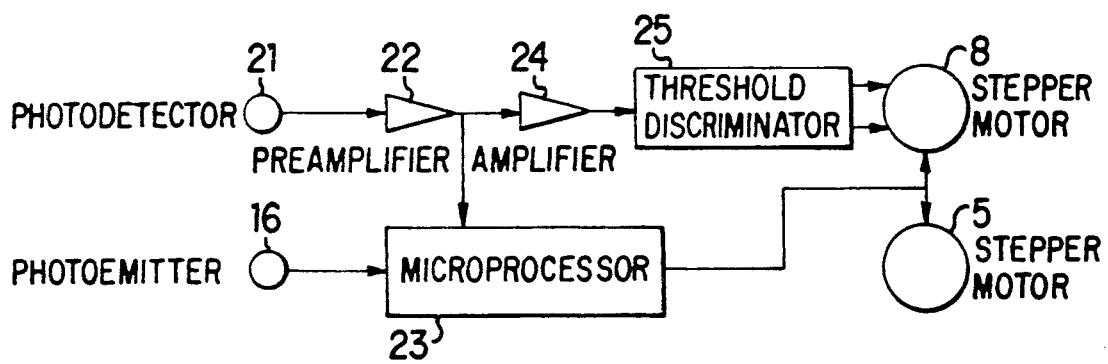
FIG. 3 shows the block diagram of the optical reader.

The optical reader according to the invention is applied to a key duplicating machine comprising a base 1 on which there is disposed a conventional cross table 2, ie a longitudinal slide 3 (with reference to the longitudinal axis of the keys) mobile along a dovetail 4 provided in said base 1 and driven by an electrical stepping motor 5.

The longitudinal slide 3 is also provided with a dovetail guide along which an overlying transverse slide 7 runs, driven by another electrical stepping motor 8.

Two clamps 9 and 10 of conventional type are applied to the slide 7 for clamping an original key 11 to be duplicated and a blank key 12 to be cut.

The optical reader according to the invention, indicated overall by 13, and a cutter 14 rotated by an electric motor 15 are fixed to the base 1 spaced apart by the distance between the reference planes of the two clamps 9 and 10 respectively, and facing these latter.

The optical reader 13 comprises:

a photoemitter 16 consisting for example of a LED and disposed above the plane in which the original key 11 is clamped in the clamp 9, a first lens 17 also disposed above said clamping plane for the purpose of collimating the luminous rays originating from the LED 16, a second lens 18 disposed below said clamping plane for the purpose of causing the collimated beam to converge, and a screen 19 disposed at a distance from said lens 18 greater than double focal length thereof. The screen 19 is contructed of a material opaque to light rays, such as metal, and comprises a small hole 20 beyond which there is positioned a photodetector 21, such as a photodiode or phototransistor.

The photodetector 21 is connected to a preamplifier 22, the output of which is connected to a microprocessor 23 and to an amplifier 24.

The output of the amplifier 24 is connected to a threshold discriminator circuit 25 provided with two outputs which control the rotation of the electric motor 8 in the two different directions.

Figure 4:
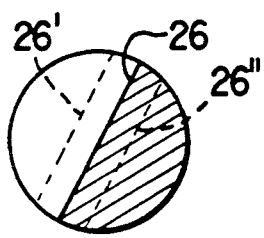
FIG. 4 is a schematic view showing the principle on which the operation of said reader is based.

The threshold discriminator 25 is set to discriminate a signal level corresponding to 50% or the maximum illumination of the photodetector 21 by the photoemitter 16. As in practice the threshold discriminator circuit 25 has an inherent sensitivity, it will provide a signal at one of the two outputs when the output signal from the photodetector 21 is less by a certain sensitivity threshold than that corresponding to 50% of its maximum illumination, and will provide a signal at the other output when the signal from the photodetector 21 is greater by said threshold sensitivity than that corresponding to 50% of its maximum illumination. The illumination conditions of the photodetector 21 at the nominal illumination value and at the two extreme values which determine the observation "window" are illustrated schematically by the reference numerals 26, 26' and 26" in FIG. 4.

The microprocessor 23 controls the power to the photoemitter 16 and also controls the entire operation of the apparatus, and in particular ensures that only after the motor 8 has halted in the correct position does the motor 5 advance through one step.

The operation of the aforesaid apparatus is as follows: after placing the original key 11 in the clamp 9 and the blank key to be cut 10 in the clamp 12, the machine is powered.

This involves an initial setting operation, effected before the key 11 is interposed between the photoemitter 16 and photodetector 21. Under these conditions the microprocessor 23 regulates the power to the photoemitter 16 such that the output voltage of the preamplifier 22 attains a predetermined value. At this point the motor 8 is automatically operated to advance the slide 4 stepwise so that the original key 11 moves towards the optical reader 13.

This movement continues until the initial portion of the profile of the key 11 begins to interfere with the path of the light beam between the two lenses 17 and 18. Following this interference the quantity of light which strikes the photodetector 21 begins to fall below the initial recorded value. The key 11 advances as the motor 8 continues to be controlled by the threshold discriminator 25 until the illumination of the photodetector 21 is such that the output signal of the amplifier 24 falls within the observation window 26',26", which signifies that the key profile falls approximately along the middle of the hole 20. Under these conditions the output signal of the threshold discriminator circuit 25 is interrupted, the motor 8 stops and the pin of the longitudinal motor 5 is caused to advance.

The advancement of the key 11 relative to the optical reader 13 due to this advancing movement of the motor 5 generally results in a different degree of illumination of the photodetector 21, to produce an output signal from the amplifier 24 which causes the motor 8 to operate in the sense of moving the key 11 towards or away from the reader, so as to return the output signal of the amplifier 24 to within the window of the threshold discriminator 25.

In practice the original key 11 oscillates about the position in which it obscures 50% of the hole 20, the amplitude of this oscillation being related to the sensitivity of the threshold discriminator circuit 25, whereas the movements depend on the "step" of the motor 8. In addition as t his oscillation occurs the motor 5 is also operated, to move in that direction which causes the key 11 to move between the two lenses 17 and 18 of the optical reader 13. The combined effect of these two movements is to move the original key 11 relative to the hole 20, in accordance with its profile.

As the distance between the light beam of the optical reader 13 and the operating "line" of the cutter is fixed and equal to the distance between the two keys 11 and 12, the movements of the slide 7 along the profile of the original key 11 results in the formation of a substantially identical profile on the blank key 12 by the cutter 14.

In this manner, using the optical reader according to the invention an original key can be duplicated without any mutual rubbing contact being required between the key and a feeler, and consequently without either undergoing wear. In addition the succession of commands to the two motors 5 and 8 can be memorized together with a corresponding reference code for that particular key, so that if further duplications are required it is a simple matter to feed said code in and obtain a copy of the original key without the need for said original key to be present.

This is achieved by means of a very simple device which can be constructed with parts easily available commercially, is of low cost and at the same time is of high sensitivity and operating precision.

Although the present invention has been shown and described with respect to a preferred embodiment thereof, it should be understood by those skilled in the art that other various changes in the form and detail thereof may be made without departing from the spirit and scope of this invention.

I claim:

1. An optical profile reader for key duplicating machines, comprising:
   (a) a light ray emitting photoemitter,
   (b) a photodetector facing said photoemitter,
   (c) an optical system interposed between said photoemitter and said photodetector and comprising at least two lenses, a first lens, located close to said photoemitter, arranged to collimate the light rays emitted by said photoemitter, and a second lens located close to said photodetector, arranged to converge said collimated light rays onto a surface interposed between said second lens and said photodetector,
   (d) a support for a three-dimensional profile to be read, said profile being placed in the path of said collimated light rays,
   (e) an electronic circuit controlled by an output signal generated by said photodetector in response to the illumination level of said photodetector, said electronic circuit comprising a threshold discriminator set at a value between the values corresponding to the maximum illumination state and the minimum illumination state of said photodetector, and
   (f) mechanical means for causing said three-dimensional profile to move in the plane orthogonal to said collimated light rays along two orthogonal directions, said mechanical means being controlled by said threshold discriminator circuit.

2. An optical reader as claimed in claim 1, wherein the surface interposed between said second lens and said photodetector is disposed at a distance from said second lens which is greater than double its focal length, said photodetector being situated in a position facing an opening in said surface.

3. An optical reader as claimed in claim 1, wherein said electronic circuit comprises a preamplifier followed by an amplifier for controlling the threshold discriminator circuit.

4. An optical reader as claimed in claim 3, wherein said electronic circuit further comprises a microprocessor which acts automatically on a power supply to said photoemitter in order to adjust the output signal of said preamplifier corresponding to the maximum illumination of said photodetector to a predetermined set value.

5. An optical reader as claimed in claim 1, wherein said threshold discriminator is set at a value corresponding to 50% of the maximum illumination of said photodetector.

6. An optical reader as claimed in claim 1, wherein said threshold discriminator is provided with two outputs which control, in two opposite directions, said mechanical means for moving said three-dimensional profile.

7. A key duplicating machine using an optical reader comprising:
   (a) a cutter;
   (b) an optical reader having an output connected to a threshold discriminator circuit;
   (c) a clamp for a blank key to be cut and facing said cutter;

(d) a clamp for an original key to be duplicated and facing said optical reader;

(e) a first stepping motor controlled in two directions of rotation by two outputs of the threshold discriminator circuit and arranged to cause said original key to be duplicated by undergoing relative movements orthogonal to the longitudinal axis of said original key and the blank key; and (f) a second stepping motor for causing the original key and the blank key to undergo said relative movements parallel to the longitudinal axis of said original key, whereby, the operation of said motor is conditioned on said blank key having attained the correct position relative to said optical reader as required for the reading of the profile of said blank key.

* * * * *